UNITED STATES PATENT OFFICE 2,337,188

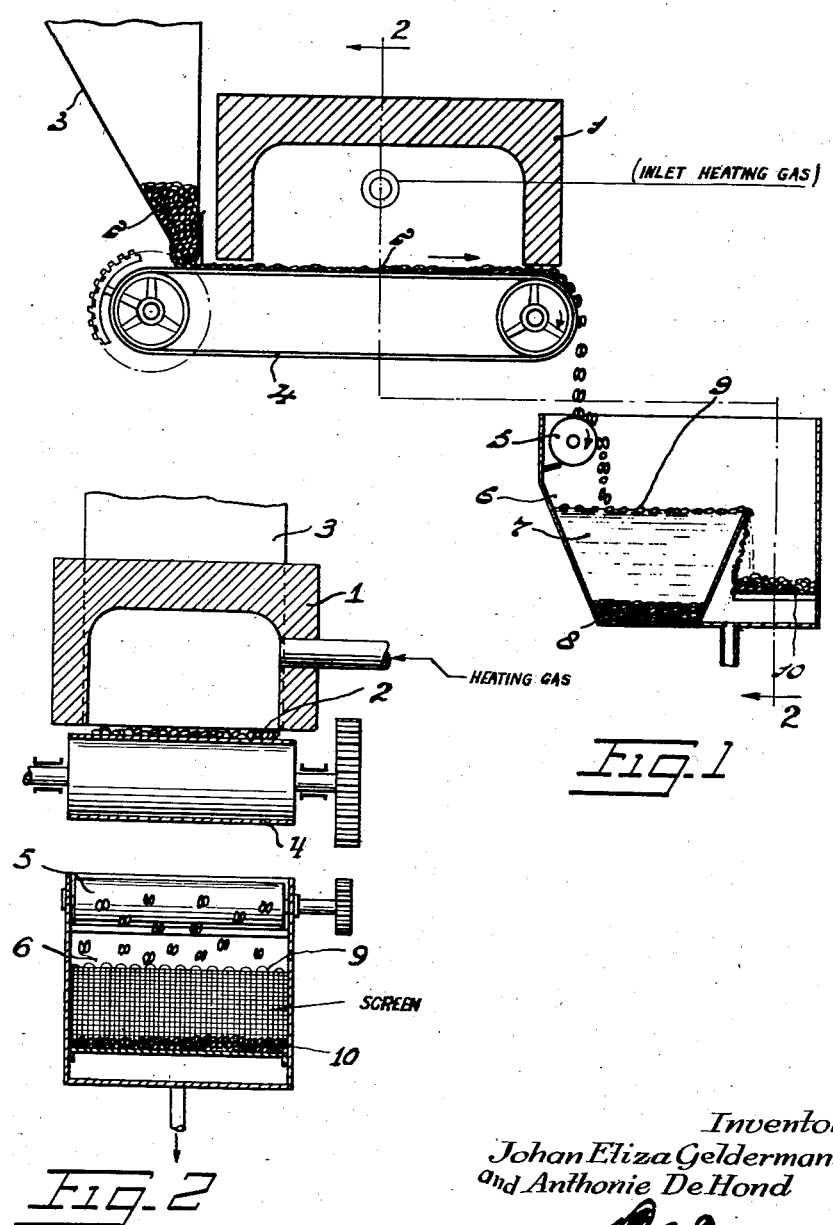

PROCESS OF SEPARATING SHELLS AND MEATS OF BIVALVE SHELLFISH

Johan Eliza Geldermans and Anthonie de Hond, Eindhoven, Netherlands; vested in the Alien Property Custodian Application April 8, 1941, Serial No. 387,504
In the Netherlands May 4, 1940

5 Claims. (Cl. 17—45)

As is well known, meats of mussels and oysters are removed from the shells by shelling by hand.

The present invention is directed to removing the shell in a simple manner, which process is suitable not only for mussels and oysters, but also for other bivalve shellfish belonging to the Lamellibranchiata.

According to the invention, the said shellfish are subjected to a momentary heating, for example of about 10 seconds, at a temperature such that the meats are disjoined from the shells, preferably higher than 1000° C., this heating being followed by sorting shells and meats.

For sorting the shells and meats use may advantageously be made of a process which is based on the difference in specific weights of shell particles and meats.

For a better understanding of the invention it is pointed out that with shellfish of the above type the difficulty of separating shells and meats is due to the fact that the shells are joined with the meats by means of powerful hinge muscles. As a result of the heating according to the invention, the muscles are released from the shells and the latter are opened, without there occurring an appreciable increase in temperature of the meats. The meats thus lie loose in the shells in a substantially unaffected raw condition.

In order that the invention may be more clearly understood and readily carried into effect, it will be explained more fully by reference to the accompanying drawing forming part of the specification and in which Fig. 1 shows a longitudinal vertical section of the preferred form of apparatus suitable for carrying out the process of the invention and Fig. 2 is a transverse vertical section on the line 2—2 of Fig. 1.

Through an oven 1 passes a flow of hot gas obtained by burning anthacite, gas, oil or other fuels. The temperature of the hot gases with which the shellfish 2 to be treated get into contact is about 1100° C. The shellfish 2 are supplied from a feed container 3 to a grid 4 moving round and, after the hot-gas treatment which lasts for about 8 seconds, they tumble from a height of about 2 metres upon an abutment 5, for example consisting of a revolving roller. The impact of the heated shellfish upon the abutment causes the meats, already loosened from their connection to the shells, to be separated from the shells. During the operation the roller moves sufficiently to prevent accumulation of the shells and meats but causes both to fall into the tank 6. A fresh roller surface is thus continuously exposed to the shellfish falling from the grid 4. The mass is subsequently taken up in a tank 6 containing a solution 7 of common salt. In this liquid the shell particles 8 settle down and the meats 9 are floated to the surface of the liquid and collected in a container 10.

If at the temperature stated above the time of heating is 4 seconds, the average temperature of the meats on leaving the oven is 48° C. and, at a heating-time of 15 seconds, 55° C.

What we claim is:

1. A process of separating meats and shells of bivalve shellfish, comprising subjecting the shellfish to a temperature greater than about 1,000° C. for a short time interval to thereby heat the shells without substantially heating the meat of the shellfish and thereafter separating the meats and shells.

2. A process of separating shells and meats of bivalve shellfish, comprising subjecting the shellfish to a temperature greater than about 1,000° C. for less than about ten seconds to thereby disconnect the shells from the meats and separating the shells and meats.

3. A process of separating shells and meats of bivalve shellfish, comprising subjecting the shellfish to a temperature of about 1,000° C. for less than about ten seconds to thereby heat the shells without heating the meats of the shellfish, and separating the shells and meats by placing the same in a liquid having a specific weight greater than that of the meats and less than that of the shells.

4. A process of separating shells and meats of bivalve shellfish, comprising subjecting the shellfish to a temperature of about 1,000° C. for less than about ten seconds to thereby heat the shells without substantially heating the meats of the shellfish, and separating the shells and meats by placing the same in a liquid in which the shells subside and the meats float.

5. A precess of separating shells and meats of bivalve shellfish, comprising subjecting the shellfish to a temperature of about 1,000° C. for less than about ten seconds to thereby heat the shells without substantially heating the meats, tumbling the heated shellfish onto an abutment and thereafter placing the said shellfish in a liquid having a specific weight greater than that of the meats and less than that of the shells.

JOHAN ELIZA GELDERMANS.
ANTHONIE de HOND.